(12) United States Patent
Paramasivan et al.

(10) Patent No.: US 11,494,179 B1
(45) Date of Patent: Nov. 8, 2022

(54) SOFTWARE UPDATE ON LEGACY SYSTEM WITHOUT APPLICATION DISRUPTION

(71) Applicant: SAP SE, Walldorf (DE)

(72) Inventors: Kirubakaran Paramasivan, Bangalore (IN); Pankaj Kumar Routray, Bangalore (IN); Lohit Kumar A. P, Bangalore (IN)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 17/307,759

(22) Filed: May 4, 2021

(51) Int. Cl.
| | |
|---|---|
| *G06F 11/00* | (2006.01) |
| *G06F 8/656* | (2018.01) |
| *G06F 16/23* | (2019.01) |
| *G06F 11/14* | (2006.01) |
| *G06F 11/20* | (2006.01) |
| *G06F 11/273* | (2006.01) |

(52) U.S. Cl.
CPC .......... *G06F 8/656* (2018.02); *G06F 11/1451* (2013.01); *G06F 11/2023* (2013.01); *G06F 11/273* (2013.01); *G06F 16/2379* (2019.01); *G06F 2201/80* (2013.01)

(58) Field of Classification Search
CPC ................. G06F 8/656; G06F 11/1451; G06F 11/2023; G06F 11/273
See application file for complete search history.

(56) References Cited

U.S. PATENT DOCUMENTS

| | | | |
|---|---|---|---|
| 8,190,780 B2 | 5/2012 | Rohland et al. | |
| 9,009,708 B2 | 4/2015 | Lu et al. | |
| 10,817,196 B2 | 10/2020 | Schreter | |
| 2015/0067405 A1* | 3/2015 | Hsieh | G06F 11/3452 714/39 |
| 2015/0120809 A1 | 4/2015 | Braemer et al. | |
| 2017/0109152 A1* | 4/2017 | Pissey | G06F 8/654 |
| 2019/0042372 A1* | 2/2019 | Kumar | G06F 11/1464 |
| 2020/0160211 A1 | 5/2020 | Kumar et al. | |

FOREIGN PATENT DOCUMENTS

KR          20010087916 A   *   9/2001

OTHER PUBLICATIONS

Vixie et al., "Name Server Operations Guide for BIND", Release 4.9.5, May 31, 1998, pp. 1-29 (Year: 1998).*
Machine Translation of KR 20010087916 A (Year: 2001).*
"What is average SSD boot time and how to increase it?"; https://coolgamesinside.com/average-ssd-boot-time/ (Year: 2020).*

(Continued)

*Primary Examiner* — Michael Maskulinski
(74) *Attorney, Agent, or Firm* — Klarquist Sparkman, LLP

(57) ABSTRACT

Methods and apparatus are disclosed to update software on a legacy system without disruption of live applications. In a database server environment, a nameserver restart can utilize a pre-existing hook facility to detect a newly introduced script and execute an initialization function of the script, leading to activation or launch of the script. In a use case of a high availability database server, the script can cause a copy of a replication status to be stored at a remote location. Upon failure of the database server, retrieval and verification of the replication status from the remote location enables failover to a replica server to be performed safely and automatically.

18 Claims, 9 Drawing Sheets

(56) References Cited

OTHER PUBLICATIONS

Amazon, "High Availability Disaster Recovery," pp. 1-23, available from https://d0.awsstatic.com/enterprise-marketing/SAP/sap-hana-on-aws-high-availability-disaster-recovery-guide.pdf (Nov. 2015).
HANA Tutorials, "Start and Stop HANA Database Service," pp. 1-3, downloaded from https://www.hanatutorials.com/p/start-and-stop-hana-database-service.html on Apr. 13, 2021.
Oracle, "Administering a CDB," pp. 1-60, downloaded from https://docs.oracle.com/en/database/oracle/oracle-database/21/multi/administering-a-cdb-with-sql-plus.html on Feb. 24, 2021.
Oracle, "Process Architecture," pp. 1-15, downloaded from https://docs.oracle.com/en/database/oracle/oracle-database/21/cncpt/process-architecture.html on Feb. 24, 2021.
SAP, "Administration Center for SAP Agile Data Preparation," pp. 1-130, available from https://help.sap.com/doc/9c77e1fdb42045398be5cd478dc2904f/1.0.19/en-US/adplspl8_admin_onprem_en.pdf (Jun. 2017).
SAP, "Application Orchestrator End User Guide," pp. 1-37, downloaded from https://help.sap.com/viewer/1c118987ef5f41238c6c68545f461ccd/1905/en-US/8b5479bd86691014bb26ade6959b0505.html# on Apr. 10, 2021.
SAP, "HANA Dynamic Tiering Administration Guide," pp. 1-208, available from https://help.sap.com/doc/9b02aa78be064734a3132f9211bd30ad/2.0.03/en-US/Dynamic_Tiering_Option_Administration_Guide_en.pdf (Aug. 2018).
SAP, "HANA Master Guide," pp. 1-84, available from https://help.sap.com/doc/e95f6750b0fd10148ea5c6be75016694/2.0.02/en-US/SAP_HANA_Master_Guide_en.pdf (Jul. 2017).
SAP, "HANA Administration Guide for SAP HANA Platform," pp. 1-2104, https://help.sap.com/doc/eb75509ab0fd1014a2c6ba9b6d252832/2.0.04/en-US/SAP_HANA_Administration_Guide_en.pdf (Oct. 2019).
SAP, "HANA Server Installation and Update Guide," pp. 1-250, available from https://help.sap.com/doc/e9702d76c3284623b02de196c0e79e49/2.0.02/en-US/SAP_HANA_Server_Installation_Guide_en.pdf (Jul. 2017).
SAP, "HANA Smart Data Streaming," pp. 1-172, available from https://help.sap.com/doc/f08aee7344a14d949cf74e2ea49643bb/1.0.12/en-US/streaming_configuration_administration.pdf (Feb. 2020).
SAP, "HANA Studio Installation and Update Guide," pp. 1-56, available from https://help.sap.com/doc/e3abfad2b0fd1014944295e9acd75d79/2.0.02/en-US/SAP_HANA_Studio_Installation_Update_Guide_en.pdf (Jul. 2017).
SAP Basis Administrator, "Sap Hana Start and Stop Commands," pp. 1-3 downloaded from https://sapbasissolutions.wordpress.com/2017/10/05/sap-hana-start-and-stop-commands/ on Apr. 13, 2021.
UIPath, "Orchestrator," pp. 1-7, downloaded from https://store.sap.com/dcp/en/product/display-0000039307_live_v1/0rchestrator on Apr. 10, 2021.
Wikipedia, "Artifact," pp. 1-2, downloaded from https://en.wikipedia.org/wiki/Artifact_(software_development) on Apr. 10, 2021.

* cited by examiner

SOFTWARE UPDATE ON LEGACY SYSTEM WITHOUT APPLICATION DISRUPTION

BACKGROUND

Software environments can have long lifetimes, during which numerous version upgrades and feature enhancements can occur. Some software system architectures may require a restart to install certain feature upgrades or new software that need to be integrated with existing software. Conventional technology has resolved such scenarios with a full restart, leading to system unavailability while the full restart is performed. Many large scale software environments can take tens of minutes or even hours to complete a full restart, which can be prohibitive if there is even a modest service level requirement for availability (uptime). Accordingly, there remains a need for improved technologies to implement software updates without disrupting operations.

SUMMARY

In summary, the detailed description is directed to various innovative technologies for activation of new software without disruption of executing applications. In examples, a new software script can be stored on a server. Restart of an auxiliary component on the server can be used to activate the script without disrupting applications executing on the server. The disclosed technologies can be applied to maintain a remote log of the server's replication status. In the event of failure of the server, the remote log can be accessed to verify the replication at the time of failure and automatically execute a failover.

In certain examples, the disclosed technologies can be implemented as a method in which a script is stored in a database environment having one or more database applications. The script is activated in the database environment by restarting a pre-existing auxiliary component of the database environment, with the database application(s) remaining operational through the activating.

In some examples, the auxiliary component can be a nameserver. In response to the restarting, the activating can include executing a hook from the auxiliary component, to initialize the script and render the script active. The script can be initialized by executing one or more initialization functions within the script. The script can enable maintenance, on distinct first and second server computers, of a replication status of the database environment. The replication status can be stored to a log, alongside a timestamp of a most recent database transaction.

In further examples, the database environment can be resident on the first server computer, and the method can also include the following operations at the second server computer: upon failure of the first server computer, an external request for the replication status of the database environment can be received, and the replication status of the database environment can be provided in response to the external request. Upon failure of the first server, and with the replication state indicating that replication of the database environment is active, primary control of the database environment can be transferred to a replica server computer that is not the first server computer.

In additional examples, the activated script can handle one or more requests from an external orchestrator through a host agent of the database environment. The database environment can include an in-memory database. The restarting can be performed in less than one minute.

In certain examples, the disclosed technologies can be implemented as computer-readable media storing instructions which are executable on one or more hardware processors, with execution of the instructions causing the hardware processor(s) to perform the following operations. A script is transmitted to a database instance comprising one or more database applications, and a restart of a pre-existing auxiliary component in the database instance is triggered, to activate the script, with the database application(s) remaining operational through the restart and the activating the script.

In some examples, the database environment can be resident on a first server, the script can be a first script activated on the first server, and the operations can also include installing a second script at a second server. The first script can be configured to save a state indicator of the database instance, and the second script can be configured to retrieve the state indicator of the database instance. The state indicator can convey whether replication of the database instance is enabled or disabled. In further examples, the first and second scripts can also be stored on the computer-readable media.

In certain examples, the disclosed technologies can be embodied in a system having multiple computing systems, each with one or more one or more hardware processors and memory coupled thereto. The computing systems include a primary database server computer, a replica server computer, and a host server computer. The system also includes a database instance distributed over at least the primary database server computer and the replica server computer, with database queries being serviced from the primary database server computer. The system has a first state in which a replication status of the primary database server computer is not guaranteed to be known upon failure of the primary database server computer, and a second state in which the replication status of the primary database server computer is guaranteed to be known upon failure of the primary database server computer. The system is configured to transition from the first state to the second state upon (i) restart of a pre-existing auxiliary component of the primary database server computer and the host server computer, resulting in activation of a first disaster recovery support program on the primary database server computer, and (ii) activation of a second disaster recovery support program on the host server computer. The database instance remains operational throughout the transition from the first state to the second state.

In some examples, the first disaster recovery support program includes a first script configured to log a replication status of the primary database server computer, the second disaster recovery support program includes a second script configured to retrieve the replication status of the primary database server computer, and the system further includes a daemon on the primary database server computer configured to monitor whether a failure has occurred on the primary database server computer. The replication status of the primary database server computer can be logged at distinct first and second storage locations, the first storage location being at the primary database server computer, and the second storage location being accessible to the second script in a condition that the first storage location is inaccessible. The daemon can be configured to copy the replication status from the first storage location to the second storage location. The system can be configured to respond to failure of the primary database server computer by executing a failover to the replica server computer, conditionally upon the replication status indicating that replication was Enabled when the failure occurred. The failover can be executed automatically.

The foregoing and other objects, features, and advantages of the invention will become more apparent from the following detailed description, which proceeds with reference to the accompanying figures.

DETAILED DESCRIPTION

Overview

Figure 1:
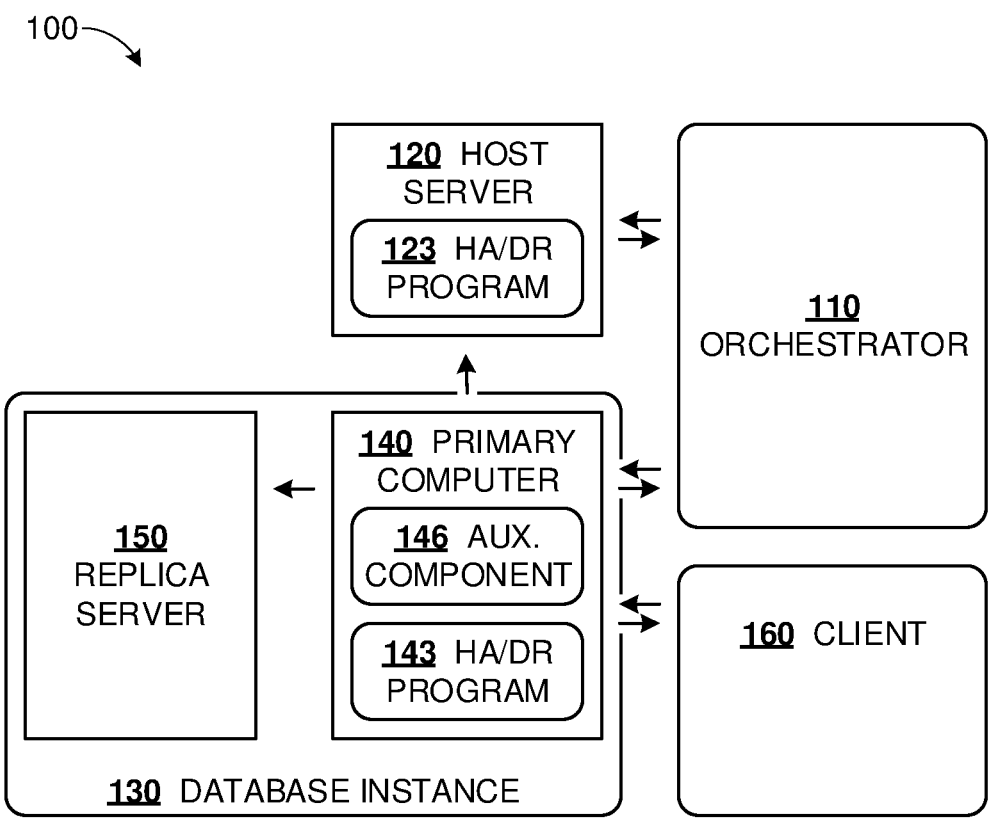
FIG. 1 is a block diagram of a first software architecture in which examples of the disclosed technologies can be implemented.

High availability database systems continue to increase in prevalence and size. Such systems commonly maintain a hot standby, or replica server, so that failover can be performed quickly with a minimum of downtime. However, there is a tradeoff between reliability (with replication enabled) and performance (with replication disabled). Accordingly, it is desirable to have a facility for disabling replication for short periods, e.g. when system usage is very high. This raises the issue of verifying the replication status when a primary server fails. If the replication status is Enabled, then failover can be executed swiftly and safely. However, if the replication status is Disabled, then failover cannot be permitted until unreplicated transactions are dealt with.

Some legacy architectures do not have remote access to the replication status of a failed server. Furthermore, in order to patch software or install new software to solve this problem, a restart can be required. For a large database system, a full restart can take an hour or more, which can be prohibitive for a high availability system.

The disclosed technologies provide a solution to this problem, using a pre-existing hook feature built into a nameserver component. This has a particular advantage that the nameserver, which is used for proper system configuration at start-up, is not required for processing routine database queries once the system is running. Therefore, a restart of the nameserver can launch a new HA/DR script, and can be performed without a full restart, without any disruption of routine processing of database queries. In some examples, the new HA/DR script can log the replication status of an instant primary server, which can be copied to a remote location (e.g. a shared path of a central host computer) using pre-existing services. Upon failure of the primary server, the remote copy of the replication status can be accessed through the central host computer, and the replication at the time of failure can be readily verified. After confirming that replication was Enabled at the time of failure, failover can be executed swiftly, safely, and automatically.

Although disclosed embodiments are described in context of an HA/DR database environment, this is not a requirement. The disclosed technologies can be used in other HA/DR applications, such as in telecommunications, oil and natural gas logging, or management of transportation systems or public utilities. The disclosed technologies can also be used in other large database environments, to perform software updates without an hours long downtime, which can be undesirable even without an HA/DR requirement. 100 TB databases are encountered in many fields including oil and natural gas, data mining applications, commercial transactions, and some proprietary data warehouses. Some web analytics, internet security, and time series databases exceed 1 PB.

Features of the disclosed technology are brought out through examples described below.

Terminology

The term "activate" refers to introduction of a new software program into a computing environment so that the new software program is available to or integrated with one or more pre-existing software programs. In some examples, a newly activated software program can be launched as a running process, but this is not a requirement. In other examples, the newly activated software program can be added to a registry where it can be called from or launched by other pre-existing software.

A "host agent" is a software component on a target computing system that can perform actions or monitoring on the target system, on behalf of a remote host computing system. Some host agents described herein provide diagnostic capabilities, but this is not a requirement, and host agents can support other functions on the target computing system.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). An application can have one or more engines (dubbed "back-ends") performing the work of the application (e.g. performing underlying data operations, maintaining state, generating or responding to requests, and so forth) and can provide one or more interfaces (dubbed "front-ends", sometimes a "user interface" or "UI") for clients or users. Some database instances described herein can include multiple applications. An index server can be an application using (for some clients) a web browser front end, and can be supported by various back ends, as described in context of FIG. 6 below.

A "client" is a hardware or software computing entity that uses a resource provided by another hardware or software computing entity dubbed a "server."

The term "component" refers to any software program item (e.g. an application, a module, a library function, or a service) in a computing environment. An "auxiliary component" is a component in a database environment that is not required for processing ordinary database queries in the running database environment, and is not a copy of such a required component. That is, an auxiliary component can provide special services, e.g. at startup, or in support of administrative, diagnostic, maintenance, or management functions. In some examples, a nameserver is used as an auxiliary component, but this is not a requirement, and other auxiliary components can be used.

A "daemon" is a background process in a computer system. Of interest in this disclosure are daemons that can monitor health of system hardware, perform watchdog or heartbeat functions, or copy indicators of state across computing systems. In some examples, a daemon can periodically request status from an HA/DR script, and can write a status value to a remote computer when the HA/DR script indicates that the status value has changed.

The unqualified term "data" refers to any digital representation of information.

A "database" (DB) is an organized collection of data maintained on computer-readable media and accessible by execution of instructions at one or more processors. Databases can be relational, in-memory or on disk, hierarchical or non-hierarchical, or any other type of database. A database can store an original or master copy of one or more data items.

A "database instance" (sometimes "database system" or "database environment") is combination of one or more databases with additional software applications for handling queries. In varying examples, a database instance can also perform analytics, can provide back-end support for a variety of forms of stored data, or can offer diverse front-end support for users and administrators, some of which are described below in context of FIG. 6 below. A single database instance can be distributed across multiple server computers, although this is not a requirement. In some described examples, a database instance can have a primary database on a primary database server computer as well as a replica database on a replica database server. A database instance is considered operational when it can receive, process, and respond to database queries from a client. Some database environments described herein can include an in-memory database, however this is not a requirement.

"Failover" is a procedure that transfers control of a software application from a first computer to a second computer, and can be performed in the event of a software or hardware malfunction, an exception, or an alert on the first computer. The second computer can be maintained as a replica of the first computer (sometimes known as hot standby), so that the failover is transparent to clients. Some failovers of interest in this disclosure are from a primary database server to a replica database server in case of a hardware failure of the primary server.

A "failure" refers to improper functioning of a computer system, and can variously be due to incorrect behavior of computing hardware, computing software, or auxiliary subsystems, in any combination. However, failure does not necessarily require that a processor halt or that a computing result be erroneous: in some examples, an alert (such as overtemperature, acoustic noise, cooling, or network alert condition—which can be warnings of other more severe imminent errors) can be regarded as a failure even if no error or halt has occurred. Of particular interest in this disclosure are hardware failures of database server computers, in which case state information stored locally on the failed computer can become inaccessible.

A "function" is an executable software module that, when executed, takes an input and optionally generates a corresponding output. The input and output can be of a same or different datatypes, and these datatypes can be simple or complex datatypes, in any combination.

"High Availability/Disaster Recovery" (or simply "HA/DR") refers to hardware or software components of a computing environment that are used to provide (a) system uptime exceeding some given service level, or (b) service continuity in the wake of a disaster. Because similar features (e.g. replication) can support both high availability and disaster recovery, the terms are often used together. To illustrate, an availability of 99.9% requires unscheduled downtime of less than 10 minutes per week, or 9 hours per year. In comparison, a large in-memory database system could take multiple hours to complete a full restart. As a further illustration, disaster recovery can pertain to disasters such as fire, earthquake, or other event which can disrupt or destroy a computing system or a data center.

A "hook" refers to a facility for an existing software program to link to or execute a new software program without any modification to the existing software program. In some disclosed examples, a nameserver can incorporate a pre-existing hook, whereby restart of the nameserver can cause an initialization function of a newly introduced script to be executed, leading in turn to activation or launch of the script.

A "host" refers to a computing system external to or distinct from an instant computing system that can be coupled to provide some service or facility to the instant computing environment. To illustrate, some database servers in this disclosure can include a host agent, which can be a local software component acting as an agent for an external host computer such as an orchestrator. As another illustration, some database servers in this disclosure can be coupled to a host computer, which can provide a storage location and software for retrieval of a remote copy of the replication status of an instant database server.

The term "install" refers to preparing a new software program for use in a software environment.

As a verb, "log" refers to an act of persistently storing a status, state, or a record of some activity in a computing environment. As a noun, "log" refers to a container of the persistently stored item or items. Of interest in this disclosure is logging the replication status of a primary database server. In some examples, the log is maintained as a JSON (JavaScript Object Notation) file, but this is not a requirement, and other forms of data storage can be used. In some examples, a database instance can have a single log file shared among multiple computing systems (e.g. a primary database server and a replica server), but this is not a requirement, and in other examples, each database server computer can maintain its own log file. In further examples, replication status can be overwritten or appended to the log file upon a change in the replication status. In some examples, a remote orchestrator can check a database server's log file (through a host agent on the database server), for example once every two seconds. A lack of response can alert the orchestrator to a possibility of failure of the database server.

The term "maintain" refers to operations that can keep data current by modifying a data item, a data structure, a database, or other collection of data through one or more updates. In this disclosure, status values, state indicator, stores, data items, or databases can variously be maintained.

A "nameserver" is a software component in a database environment or other software environment that can provide topology and distribution information or other configuration information so that the software environment can start up with all components correctly configured with respect to each other and with respect to persistent stored data of the software environment. In some examples, a nameserver restart can be performed in less than one minute.

The term "orchestrator" refers to system management software that is external or remote to one or more computing systems being managed. An orchestrator can monitor activity, status, or system health across multiple managed systems; can receive notifications from managed systems; or can launch or control administrative actions or processes on the managed systems. An orchestrator can be operated directly by a system administrator, or can be programmed to execute tasks autonomously. In some described examples, an orchestrator can load software onto a target system, can initiate full or partial restart, can monitor the target system through a host agent, can receive notification of system failure, can check or change the replication state of a target system, or can initiate failover. An orchestrator is not a client or peer of a managed system.

A "database query" (or simply "query") is a request to perform an operation on a database. A query can perform reading, writing, or modifying of underlying data or database tables, in any combination. That is, some queries can request data to be returned from the database according to a specified condition, without making any change to the data, while other queries can add new data items (e.g. a new table or a new row in an existing table), and further queries can update (e.g. modify, or over-write) one or more existing data values in the database. Queries can also request deletion of one or more data items, or reorganization of data (e.g. a sort).

The terms "receive" and "transmit" refer to communication over a network, which can be in the form of a message. The communication can be electromagnetic, e.g. over wired, wireless, or optical media, but this is not a requirement.

"Replication" refers to an act of propagating transactions at a first computing environment to a second computing environment, so that some software and/or data at the second computing environment can be maintained in a same state as at the first computing environment. The first computing environment can be designated a "primary environment". In some disclosed database examples, the first environment can be a primary database server computer (or "primary database server" for short), and can receive client queries, perform the requested actions, and return appropriate responses. The second computing environment can be a "replica environment", or more specifically a replica database server computer (or "replica server" for short). The primary database server and the replica server can be part of a single database instance, but this is not a requirement.

"Replication status" refers to whether replication is enabled or disabled at a particular computing environment. In examples, replication status can have two values, denoted Enabled and Disabled herein. When replication status is Enabled, transactions at a primary environment are transmitted to a replica server and executed at the replica server, so that the replica server can be maintained in a same state (e.g. database state) as a primary environment. When replication status is Disabled, the primary environment transactions are not replicated at a replica server. While disclosed examples employ Enabled and Disable status values, additional values of the replication status can also be used. In some examples, different status values can be used for planned or unplanned disablement of replication. An example of planned disablement can occur when a system administrator suspends replication for temporary enhancement of performance, while an example of unplanned disablement can occur due to a network outage. In further examples, additional status values can be used when a change of replication status is pending.

A "request" is a message to which a substantive response ("response") is expected, that is, a response beyond an acknowledgment. A request can also be a message for which a recipient of the message is expected to take a specified action. In contrast, a "notification" need not receive a substantive response, nor result in any specific action.

"Restart" refers to an operation of terminating a software program (e.g. a process, service, or application) and launching the same program (or an updated version of the same program) again.

A "script" is a software program in the form of source code, suitable for processing by an interpreter on a computer. Some disclosed examples use Python scripts, however this is not a requirement, and Bash, Perl, or other scripting languages can also be used.

A "server" is a computer, implemented as hardware on which software is executed, providing a service or access to a resource for at least one client, and often for a plurality of clients. Inasmuch as the server functionality requires both hardware and software components, the description herein of a server is not limiting and can include either or both components. Where the distinction is relevant, more precise terms such as "server software" "server service" or "server program" are sometimes used for the software component, while "server computer" is sometimes used for the hardware component. Particularly, a server computer can implement multiple server programs, and some server programs can be distributed across multiple server computers, while in other situations there can be a 1:1 relationship between a server program and a server computer. In this disclosure, servers can implement software applications, databases, front-end or back-end logic, services, user interfaces, or can provide other functions.

A "shared filesystem path" is a facility for two or more computers to share a storage resource. In some examples, data written by one computer to the shared storage can be read by the other computer and vice versa, while in other examples permissions to the files or other data objects on the shared resource can be asymmetric. Permissions can vary from one file or data object to another on a single shared storage resource. The shared resource can be memory (e.g. random access memory: main memory or cache) or a persistent storage medium (e.g. a hard disk, a flash drive, or an optical disk).

"Software" refers to computer-executable programs or instructions and associated data structures. Software can be in active or quiescent states. In an active state, software can be loaded into memory, or can be undergoing execution by one or more processors. In a quiescent state, software can be stored on computer-readable media, awaiting transmission or execution.

A "timestamp" is a specification of a time associated with a database transaction. A given transaction can be associate with multiple times, e.g. a source time at which a client issued a query which initiated the instant transaction, a receipt time when the client query was received at a database instance, or a commit time when the transaction was committed to an underlying database. In disclosed examples, any of these time markers or other time markers can be used, singly or in combination.

A "database transaction" (or simply "transaction") is a change in a database, such as insertion of new data, deletion of existing data, a modification of an existing data value, a reorganization of data (e.g. a sort), or a change of database metadata.

The term "trigger" refers to a first act that causes a second act to occur. In some examples, an orchestrator can send a request (the first act) for a nameserver restart (the second act) to a database server First Example Software Architecture FIG. 1 is a block diagram 100 of a first software architecture in which examples of the disclosed technologies can be implemented. In this architecture, a client-server database environment is managed by an orchestrator and augmented with a host server. To facilitate description, software entities are shown in FIG. 1 as rectangles with rounded corners, while hardware entities are shown as rectangles with square corners. The skilled artisan will recognize, with this disclosure, that software entities can be implemented on underlying computer hardware, while hardware entities can store or run software to provide described functionality. For example, client 160 can be implemented on client hardware (not shown), while replica server 150 can incorporate operating system, database application, or communication software (not shown). Further, directional arrows are sometimes used to indicate a principal direction of information flow; underlying communications can also include acknowledgments, notifications, or other messages or requests in the opposite direction.

In FIG. 1, interactions between client 160 and database instance 130 can provide a primary functionality of the illustrated architecture. Client 160 can issue database queries to database instance 130 and receive responses in return. Database instance 130 can be distributed across multiple servers, including one primary server 140, and at least one replica server 150. Primary server 140 can handle queries from client 160. While replication is enabled, transactions on primary server 140 can be transmitted to replica server 150 for execution on replica server 150, so that replica server 150 can maintain a state of database instance 130 that matches the database state managed by primary server 140. Host server 120 can be coupled to primary server 140. Both host and primary servers 120, 140 can be managed by orchestrator 110.

Primary server 140 can have auxiliary component 146 ("Aux. Component") installed, and can be configured so that restart of the auxiliary component 146 can be performed while other database components of database instance 130 (including components on primary server 140) remain operational. Primary server 140 can also have a new disaster support recovery program ("HA/DR Program") 143 stored locally, which can be activated upon restart of auxiliary component 146.

Database instance 130 can have a pre-existing HA/DR facility for disabling replication for reasons such as performance enhancement or maintenance. That is, the replication status of primary server 140 can be either Enabled or Disabled, such status being stored locally at primary server 140. Thus, prior to activation of HA/DR program 143, the locally stored replication status can be lost in the event that primary server 140 fails. While orchestrator 110 can detect a failure of primary server 140 (e.g. by finding primary server 140 to be unresponsive), orchestrator 110 may be unable to determine the replication status of primary server 140 at the time of failure. Without knowing the replication status of primary server 140, orchestrator cannot automatically trigger failover of database instance 130 to replica server 150, and availability of database instance 130 can fall below a predetermined threshold.

Once activated, HA/DR program 143 can cause locally stored replication status to be copied to host server 120, where it can be retrieved by orchestrator 110 in the event that primary server 140 fails. Thereby, orchestrator 110 can determine with certainty the replication status of primary server 140 from host server 120 when primary server 140 fails or becomes unresponsive. If the replication status is found to be Enabled, then orchestrator 110 can safely and automatically initiate failover, allowing database instance 130 to smoothly continue operation with a minimum of downtime.

Numerous variations or extension of the illustrated architecture can be implemented. In some examples, orchestrator 110 can be implemented on the host server. In further examples, the cardinality of the illustrated components can be varied. Multiple database instances 130 can share a host server 120 or orchestrator 110. database instance 130 can have multiple replica servers 150. Multiple clients can be coupled to query database instance 130. HA/DR program 123 can provide complementary functionality to HA/DR program 143. That is, HA/DR program 143 can cause the replication status of primary server 140 to be stored at host server 120, HA/DR program 123 can be used to read and provide this replication status in response to a request by remote orchestrator 110.

In further examples, HA/DR program 143 can store the replication status of primary server 140 locally at a first storage location, e.g. in a JSON file, from where an HA/DR daemon (not shown) can copy this replication status to host server 120. The copy of the replication status can be maintained at a second storage location which is and remains accessible to host server 120 upon failure of primary server 140. For example, the second storage location can be on a shared filesystem path, not local to primary server 140, and accessible to both host server 120 and the HA/DR daemon. In some examples, the HA/DR daemon can be a pre-existing component configured to monitor whether a failure has occurred on primary server 140 and to provide a heartbeat signal to host server 120, while in other examples the HA/DR daemon can be part of HA/DR program 143.

Responsive to failure of primary server 140, the illustrated system can be configured to check replication status of primary server 140, e.g. by request to host server 120. Upon determination that the replication status was Enabled at the time of failure of primary server 140, the system can be configured to execute a failover of database instance 130 to replica server 150. The failover can be executed automatically. Orchestrator 110 can automatically perform one or more of: detecting primary server 140 failure; checking replication status of primary server 140; or initiating failover.

Because a replica server can be functionally a copy of primary server 140, and can swap roles with primary server 140, the instant method (including optional variations or extensions) can also be used to activate another copy of HA/DR program 143 on the replica server.

First Example Method

Figure 2:
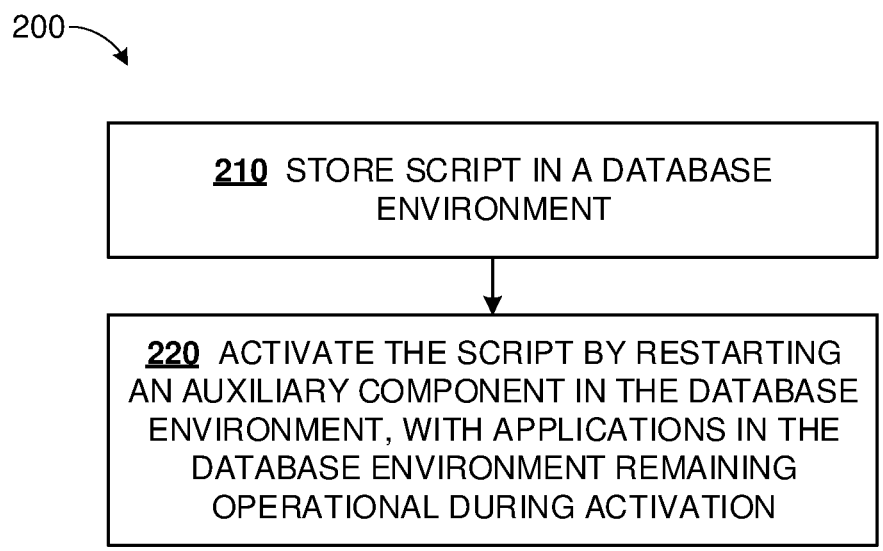
FIG. 2 is a flowchart of a first example method according to the disclosed technologies.

FIG. 2 is a flowchart 200 of a first method. In this method, a database environment remains operational while a script is loaded and activated. With reference to FIG. 1, the database environment can be similar to primary server 140 and can be part of a database instance similar to 130. The first method can be performed at primary server 140.

At process block 210, a script is stored in a database environment. The script can provide a feature enhancement in the database environment. In some examples, the database environment can be an HA/DR environment, and the feature enhancement can provide a replication status of the database environment to be copied to a remote location where the replication status can be accessible in the event of a failure in the database environment.

At process block 220, the script can be activated by restarting a pre-existing auxiliary component in the database environment, whereby the database environment remains operational to receive and handle client queries during the auxiliary component restart and script activation.

Numerous variations or extension of the first method can be implemented. The auxiliary component can be a nameserver. Because the nameserver is involved at start-up of the database environment and is not involved in serving client database queries, restart of the nameserver can allow query handling to proceed uninterrupted even as the nameserver terminates and restarts. The auxiliary component can incorporate a pre-existing hook facility, such that one or more hook functions are executed at restart, and one of these hook functions recognizes the new script and causes an initialization function within the script to execute, leading to activation of the script. Particularly, activation can variously include launching a process for the script in the database environment, or registering the script so that other software components within the database environment can find and call the script. The script can enable maintenance of a replication status of the database environment on two or more distinct servers, one of which can be a server on which the database environment is running or which is part of the database environment, and another server that can host a shared filesystem path. The replications status can include a categorical variable indicating replication status as Enabled, Disabled, or other defined statuses. The replication status can be stored in a log file, which can also include a timestamp of a most recent database transaction in the database environment. All or part of a log file on the primary server 140 can be copied to the shared filesystem path or another remote location.

In addition to database queries from clients, database environment can receive and handle management commands or requests, such as from an external orchestrator. Certain of these requests can be directed to the newly activated script through a host agent in the database environment. In some examples, an orchestrator can request current replication status, can request notification of future changes in replication status, can request the replication status to be changed or set, or can manage the script process. Further, prior to activation of the script, the orchestrator can trigger performance of block 210 or block 220. Still further, after activation of the script and upon failure of the database environment, the orchestrator can detect the failure, can request the copy of the replication status from the shared filesystem path, or can verify that replication status was Enabled at the time of failure. Upon determination that the replication status was Enabled, primary control of the database instance can be transferred to its replica server.

Responsive to the database environment failure, the second server can receive the orchestrator's request for the database environment replication status, can retrieve the most recent database environment replication status at the time of failure, and can provide this status to the orchestrator in response to the orchestrator's request. The method can extend to installation of a second script on the second server to support this functionality.

Second Example Method

Figure 3:
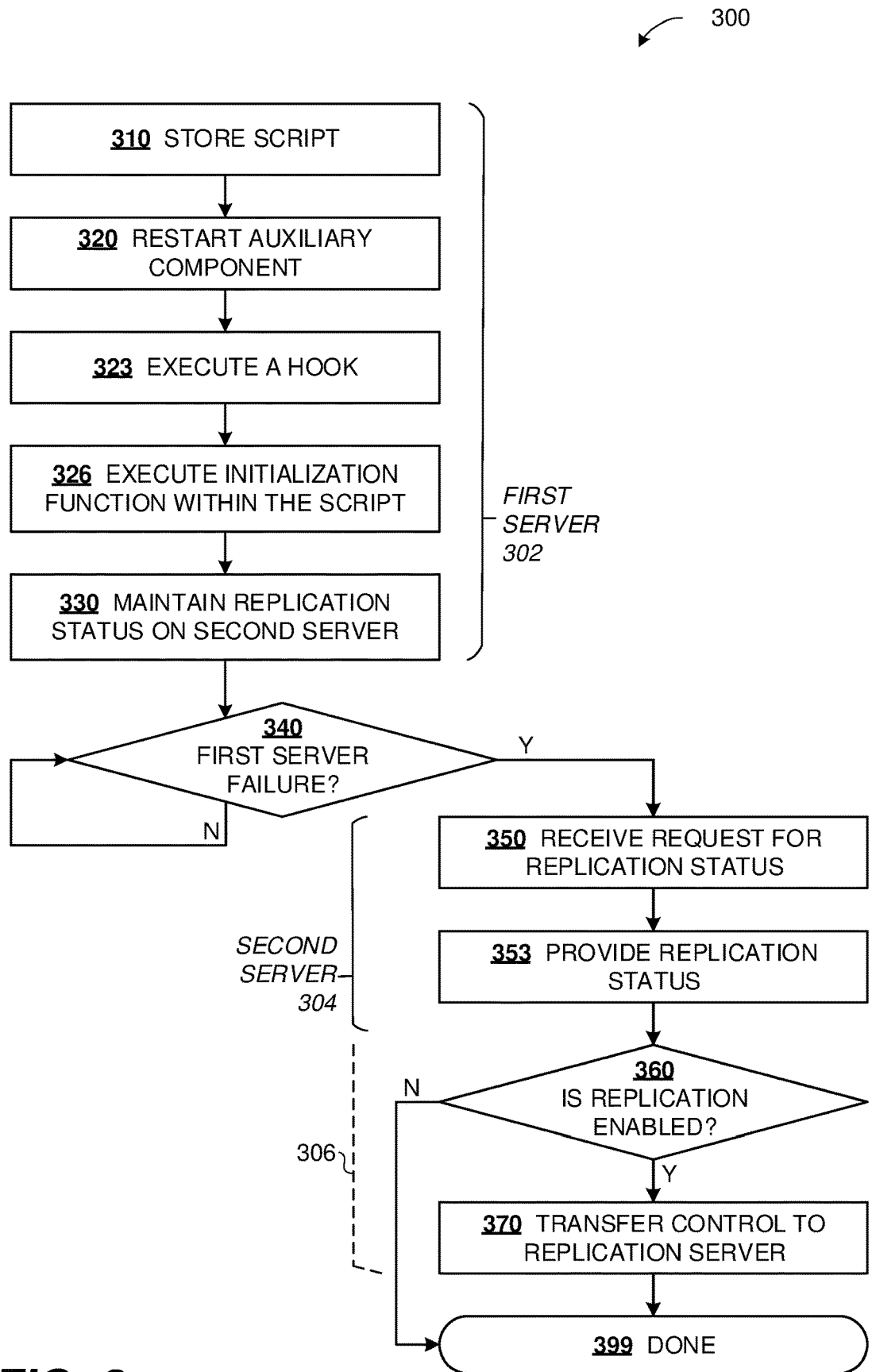
FIG. 3 is a flowchart of a second example method according to the disclosed technologies.

FIG. 3 is a flowchart 300 of a second method. This method can be performed partly at first server 302 similar to primary server 140 and partly at second server 304 similar to host server 150. At the first server 302, the method activates a script to initiate sharing the replication status of server 302 across servers 302, 304. Later, when first server 302 has failed, second server 304 is able to retrieve the replication status of first server 302 in spite of the failure, as a precondition for executing failover.

At process block 310, a script is stored. The script can be received from an orchestrator or another external source, and stored at first server 302. At process block 302, an auxiliary component can be restarted. The auxiliary component can be a nameserver at first server 302. At process block 323, the auxiliary component can execute a hook as it restarts, which can detect the script stored at block 310. At process block 326, using the hook mechanism, an initialization function within the script can be invoked. In some examples, other applications can remain operational over the duration of blocks 320, 323, 326. The initialized script can be available and integrated within the software environment of server 302 following block 326, and can either be launched automatically upon initialization, or later, in response to a command (such as from an orchestrator).

Then, with the script running, replication status of first server 302 can be maintained on second server 304, at process block 330. In some examples, the script can write the replication status locally at first server 302, and a pre-existing daemon can copy the replication status to a shared filesystem path outside server 302, where second server 304 can access the replication status even if first server 302 experiences a total failure. In other examples, the script can write directly to the shared filesystem path without the daemon's involvement.

First server 302 can continue operation, optionally with occasional switches in replication status from Enabled to Disabled or vice versa. For example, replication can be disabled in order to free up computational resources at server 302 and provide a temporary boost in performance. Replication can also be disabled in other examples, e.g. when a maintenance is scheduled on the replica server, or a brief duration when server 302 switches roles with a replica server, which can also happen under program control, i.e. without any fault indication.

As first server 302 continues operation, its health can be monitored at decision block 340. If no failure is detected, the method follows the N branch back to block 340 to continue monitoring. However, if or when a failure is detected, the method can follow the Y branch to block 350. In some examples, block 340 can be performed partly at first server 302 itself, e.g. by a daemon performing a heartbeat service, or by a utility actively checking software fault conditions. In some examples, block 340 can be performed partly or wholly outside server 302, e.g. by watching heartbeat or other activity signals from server 302. The second server or an orchestrator can monitor the failure or health status of 302.

Turning to second server 304, and responsive to a failure detected at block 340, a request for server 302's replication status can be received at block 350. The replication status can be retrieved and provided to the requester at block 353. Blocks 350, 353 can be performed at second server 304 distinct from first server 302. The request at block 350 can be received from an orchestrator.

At decision block 360, a check can be made whether replication status was Enabled at the time of failure. If replication status was not Enabled, the method can follow the N branch from block 360 to terminate at block 399. An administrator can be notified to investigate and take further action. However, if replication status was Enabled, the method can follow the Y branch to block 370, where control of a software environment can be transferred automatically to a replica server, and high availability can be maintained. In some examples, blocks 360, 370 can be performed by an orchestrator (which can also be the originator of the request at block 350), while in other examples blocks 360, 370 can be performed internally within second server 304 (as indicated by dashed line 306). That is, blocks 350, 360 can be executed by an HA/DR script on second server 304 responsive to a HA/DR supervisory program also executing on second server 304. The HA/DR supervisory program can also perform blocks 360, 370.

Third Example Method

Figure 4:
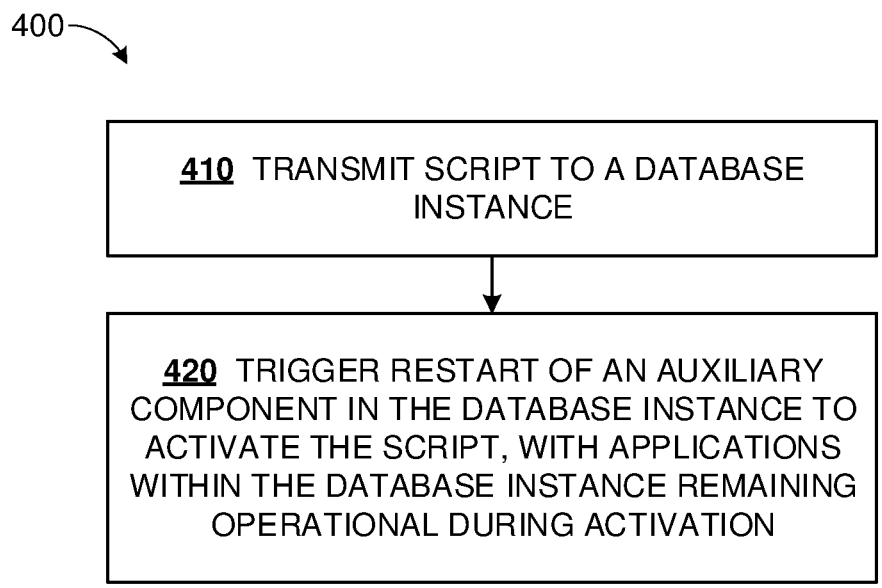
FIG. 4 is a flowchart of a third example method according to the disclosed technologies.

FIG. 4 is a flowchart 400 of a third method according to the disclosed technologies. In this method, applications of a database instance remain operational while a script is activated. With reference to FIG. 1, the database instance can be similar to database instance 130 and can be running on a server similar to primary server 140. The third method can be performed by an orchestrator similar to 110.

At process block 410, a script can be transmitted to a database instance. The script can provide a feature enhancement to the database instance. In some examples, the database instance can support HA/DR, and the feature enhancement can provide a replication status of the database instance to be copied to a remote location where the replication status can be accessible in the event of a failure within the database environment.

At process block 420, a restart of a pre-existing auxiliary component in the database instance can be triggered. The restart can cause the script to be activated, while the database instance remains operational to serve client database queries through the auxiliary component restart and script activation.

Numerous variations or extension of the third method can be implemented. In some examples, the script can be a first script and the method can include installing a second script at a second server separate from the database instance. In some examples, installation and activation of the second script can follow the technique used for activation of the first script. In other examples, database applications or a nameserver component can be absent on the second server, or the second server may not be subject to a high availability requirement, and other techniques can be used to install the second script, including a full restart of the second server.

The first script can be configured to store an indicator of a state of the database instance, while the second script can be configured to retrieve the state indicator. A state indicator can convey information regarding a replication status, a utilization factor, system health (hardware or software), notifications or alerts, or other state information. In varying examples, the second script can retrieve the state indicator from a shared filesystem path separate from the database instance, or from local storage at the second server. The method can include causing the second script to be queried to retrieve the database instance state indicator, in response to a failure of the database instance, and to causing failover of the database instance to a replica server. The third method can be embodied as executable instructions on a computer-readable media, such that execution of the instructions causes the above operations or process blocks to be executed. The computer-readable media can also store the first script or the second script, such that execution of these scripts, on a server of the database instance or on the second server, causes performance of actions coded in the respective scripts.

Second Example Software Architecture

Figure 5:
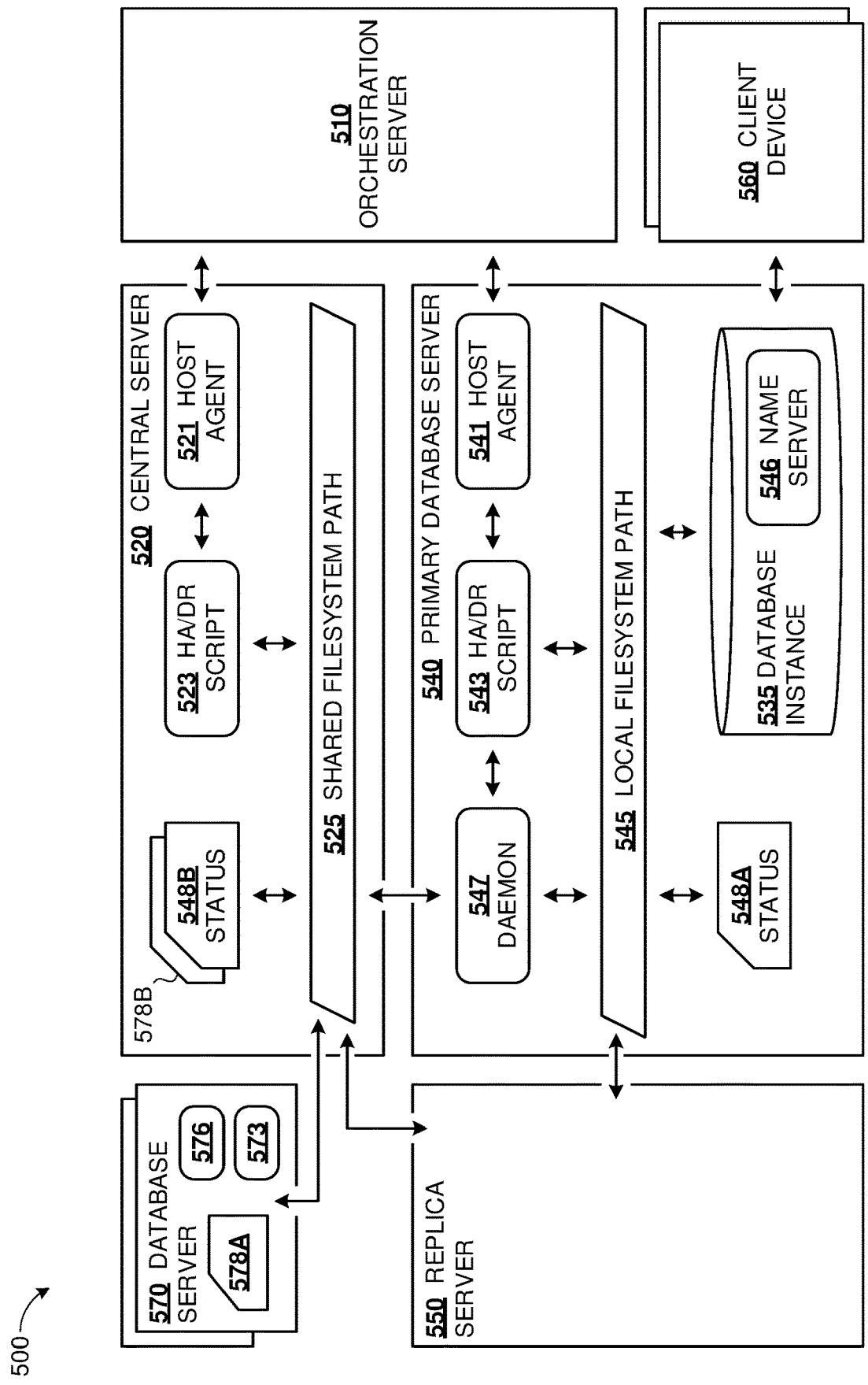
FIG. 5 is a block diagram of a second software architecture in which examples of the disclosed technologies can be implemented.
Figure 6:
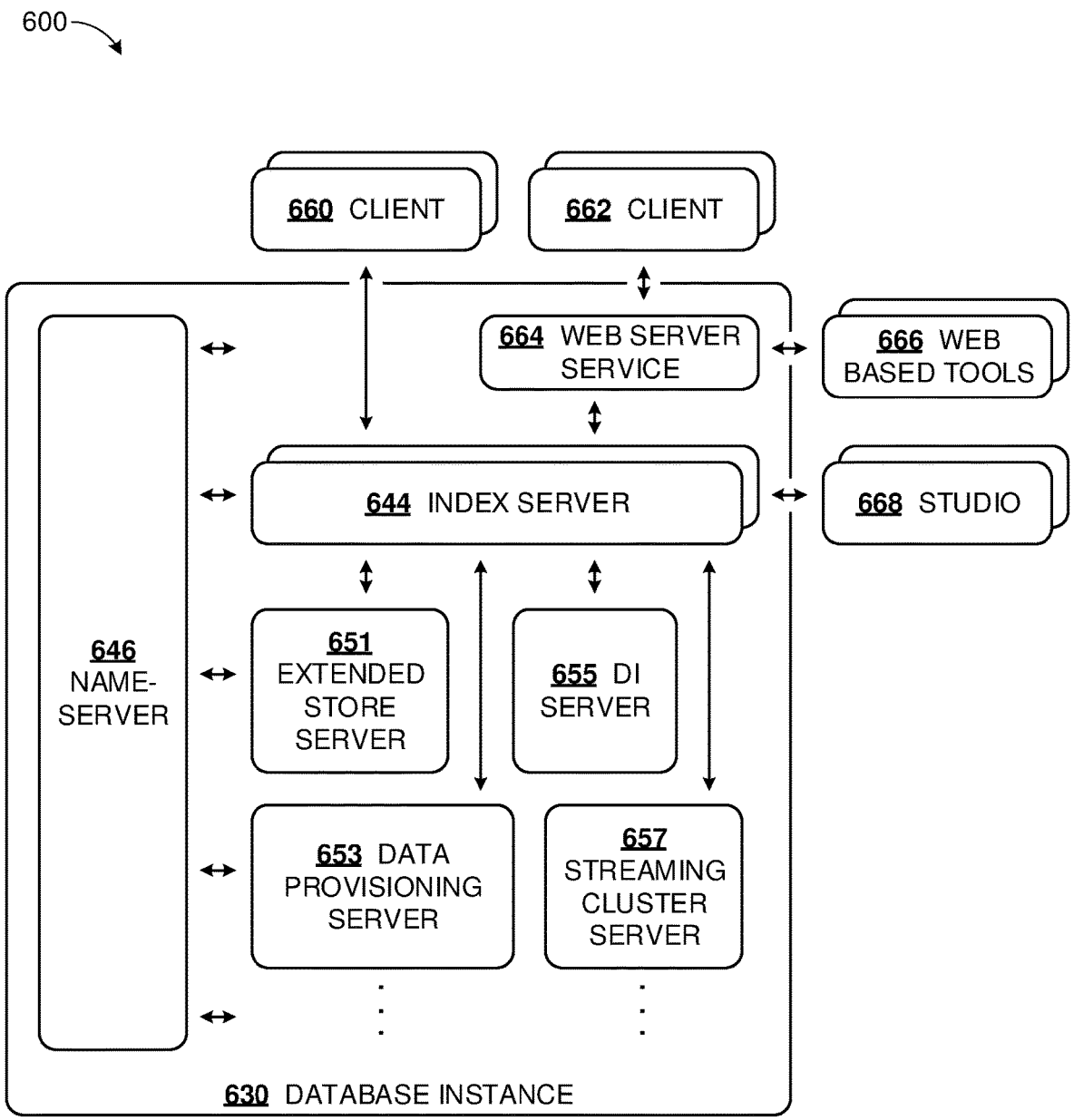
FIG. 6 is a block diagram of a first example database system with which the disclosed technologies can be implemented.
Figure 7:
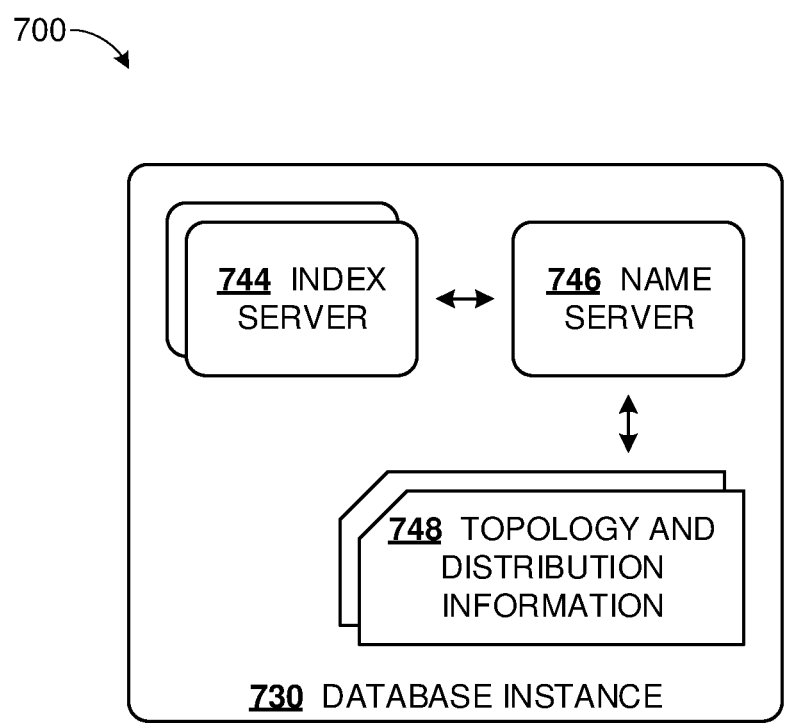
FIG. 7 is a block diagram of a second example database system with which the disclosed technologies can be implemented.

FIG. 5 is a block diagram 500 of a second software architecture in which examples of the disclosed technologies can be implemented. FIGS. 5-7 follow similar conventions as FIG. 1. In FIG. 5, one or more client devices 560 can be configured to send queries to, and receive responses from, database instance 535 running on primary database server 540. Primary database server 540 can also be coupled to replica server 550, which can maintain a replica of database 535; a central server 520, which can provide support or administrative services to primary database server 540 and optionally other database servers 570; and orchestrator server 510, which can provide management functions to servers 520, 540 as shown, and optionally also to replica server 550 and other database servers 570 (whose communication paths to orchestration server 510 are not shown in FIG. 5). Orchestration server 510 can be communicatively coupled to host agents 521, 541 on servers 520, 540 so as to enable orchestrator software on orchestration server 510 to remotely perform management actions on servers 520, 540 respectively. For example, host agents 521, 541 can request local copies of the replication status of server 540 by communicating with HA/DR script 523, 543 respectively. Primary database server 540 can incorporate a local filesystem path through which various other components in primary database server 540 are communicatively coupled to each other or to local storage. Once activated, HA/DR script 543 can maintain replication status of primary database server 540 in status indicator 548A. As discussed herein, HA/DR script 543 can be activated by restart of nameserver 546.

Daemon 547 can provide monitoring or watchdog functions on primary database server 540, and can copy status indicator 548A to a second storage location on a shared filesystem path 525 as status indicator 548B. That is, daemon 547 can maintain status indicator 548B as an up-to-date copy of the original status indicator 548A maintained by HA/DR script 543. In other examples, status indicator 548A can be omitted, and status indicator 548B can be written directly to shared filesystem path 525. In varying examples: HA/DR script 543 can push the status indicator to daemon 547 to be transmitted and stored as status indicator 548B; HA/DR script 543 can write indicator 548B directly (communication path not shown); or daemon 547 can poll HA/DR script 543 for the status value, and can store the value as status indicator 548B. In some examples, daemon 547 can be a pre-existing software component, and pre-existing status indicators 548A, 548B can be augmented by a field for replication status of primary database server 540 after HA/DR script 543 is activated. In other examples, activation of HA/DR script 543 can be accompanied by installation, replacement, or upgrade of daemon 547 to support HA/DR script 543.

Central server 520 is not limited to supporting only primary database server 540, but can also provide similar support to one or more additional database servers 570, each of which can have its own nameserver 576, HA/DR script 573, and optional local status indicator 578A. The additional database servers can be managed similarly to primary database server 540: a restart of nameserver 576 can activate HA/DR script 573 without disruption of applications running on server 570; and local replication status 578A can be copied through shared filesystem path 525 and stored as replication status indicator 578B. Shared filesystem path 525 is illustrated as being within central server 520, however this is not a requirement. In other examples, shared filesystem path 525 can be remote, but accessible, from both servers 520, 540.

First Example Database System

FIG. 6 is a block diagram 600 of a first example database system with which the disclosed technologies can be implemented. In database instance 630, index servers 644 provides central functionality for handling queries from clients 660, 662. Standard clients 660 can support a database query language such as SQL (structured query language) or MDX (multidimensional expressions) and can communicate directly with index servers 644, while web clients 662 can utilize a web server 664 integrated within database instance 630. Web server 664 can also support additional web based tools 666, providing administrative or management functions for database instance 630. Index server 644 can also support external studio software 668, which can also provide one or more client-side tools for managing database instance 630. In turn, index server can rely on other software components as shown: extended store server 651 can support database tables distributed over multiple stores; data provisioning server 653 can support integration of data from mixed sources using pre-built or custom adapters; DI (deployment infrastructure) server 655 can support deployment of end-user applications or complex data objects; and streaming cluster module 657 can support a cluster of server computers configured to process streaming data. As indicated by ellipses below components 653, 657, these back-end components are merely illustrative of numerous components that may be present in a database system. Nameserver 646 can manage topology and distribution information for database instance 630, so that at startup, each of the other components of database instance 630 can be correctly configured for the data and server architecture.

Second Example Database System

FIG. 7 is a block diagram 700 of a second example database system showing certain components relevant to some examples of the disclosed technologies. In database instance 730, one or more index servers 744 can handle client database queries, perform corresponding actions on underlying database tables, and send corresponding responses to clients from whom the queries are received. Nameserver 746 can manage topology and distribution information 748 of the database system, which can include information defining how database tables are partitioned and where they are located. Generally, index servers 744 can obtain necessary topology and distribution information 748 at startup through nameserver 746. After startup, client queries can be handled without recourse to nameserver 746 or topology and distribution information 748. Accordingly, a restart of nameserver 746 can be performed without impacting routine query handling by database instance 730 or index servers 744.

A Generalized Computer Environment

Figure 8:
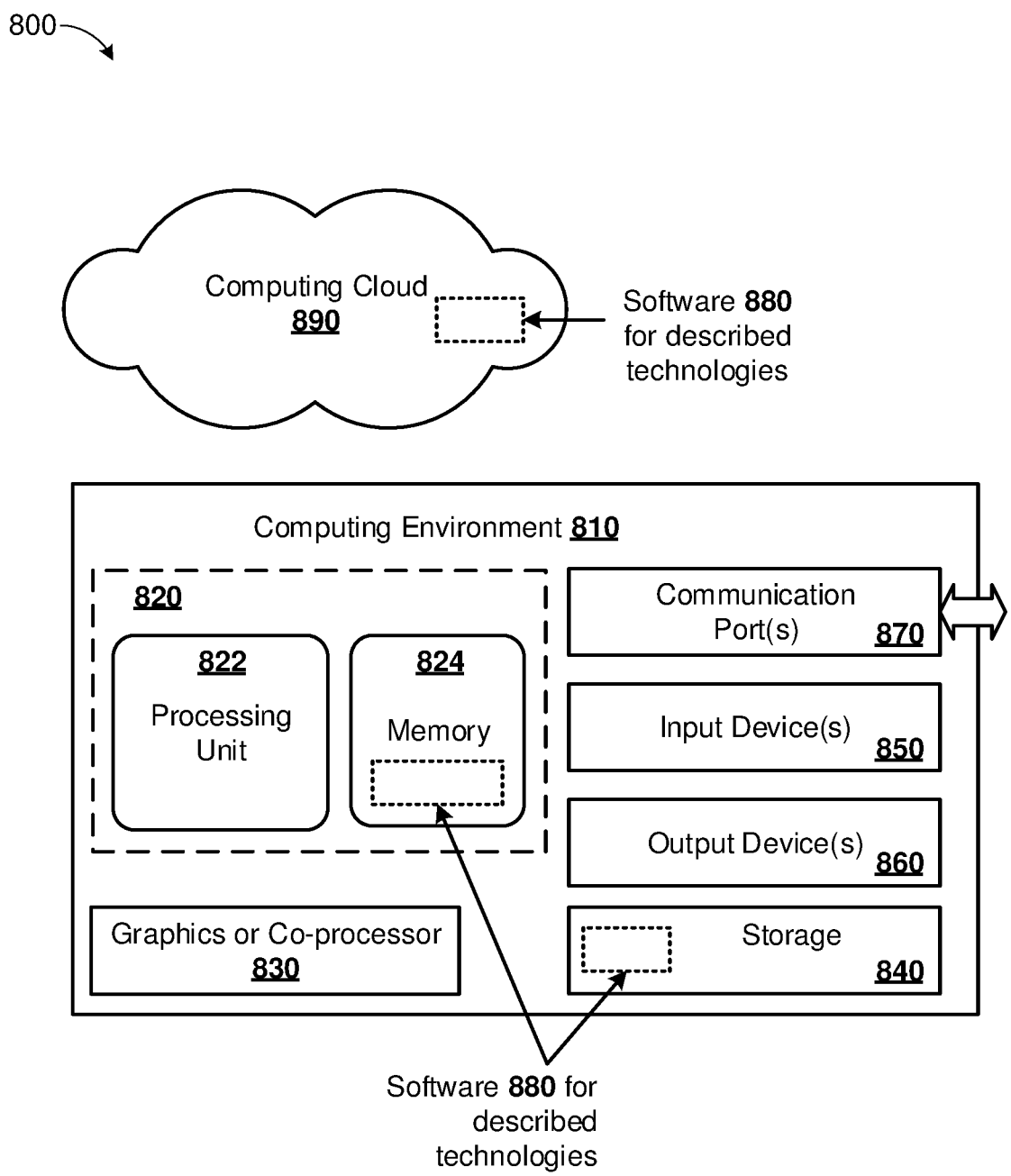
FIG. 8 is a diagram schematically depicting a computing environment suitable for implementation of disclosed technologies.

FIG. 8 illustrates a generalized example of a suitable computing system 800 in which described examples, techniques, and technologies, including construction, deployment, operation, and maintenance of auxiliary components, log files, diagnostics, or HA/DR services can be implemented according to disclosed technologies. The computing system 800 is not intended to suggest any limitation as to scope of use or functionality of the present disclosure, as the innovations can be implemented in diverse general-purpose or special-purpose computing systems.

With reference to FIG. 8, computing environment 810 includes one or more processing units 822 and memory 824. In FIG. 8, this basic configuration 820 is included within a dashed line. Processing unit 822 executes computer-executable instructions, such as for implementing any of the methods or objects described herein for updating, activating, or introducing software without application disruption, detecting status of a failed computing system, executing failover; or various other architectures, software components, handlers, managers, modules, or services described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. Memory 824 can store software 880 implementing one or more innovations described herein, in the form of computer-executable instructions suitable for execution by the processing unit(s) 822, 830. The memory 824 can also store database software components, scripts, hook functions, status or state indicators, log files, handlers, configuration data; data structures including data tables, working tables, change logs, output structures, data values, indices, or flags, as well as other operational data.

A computing system 810 can have additional features, such as one or more of storage 840, input devices 850, output devices 860, or communication ports 870. An interconnection mechanism (not shown) such as a bus, controller, or network interconnects the hardware components of the computing environment 810. Typically, operating system software (not shown) provides an operating environment for other software executing in the computing environment 810, and coordinates activities of the hardware and software components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein.

The input device(s) 850 can be a mechanical, touch-sensing, or proximity-sensing input device such as a keyboard, mouse, pen, touchscreen, trackball, a voice input device, a scanning device, or another device that provides input to the computing environment 810. The output device(s) 860 can be a display, printer, speaker, optical disk writer, or another device that provides output from the computing environment 810.

The communication port(s) 870 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technologies are executed. Any combination of memory 824, storage 840, and computing cloud 890 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Occasionally, the term "computer" is used to refer to a computing system. Virtual processors, virtual hardware, and virtualized devices are ultimately embodied in a hardware processor or another form of physical computer hardware, and thus include both software associated with virtualization and underlying hardware.

Example Cloud Computing Environment

Figure 9:
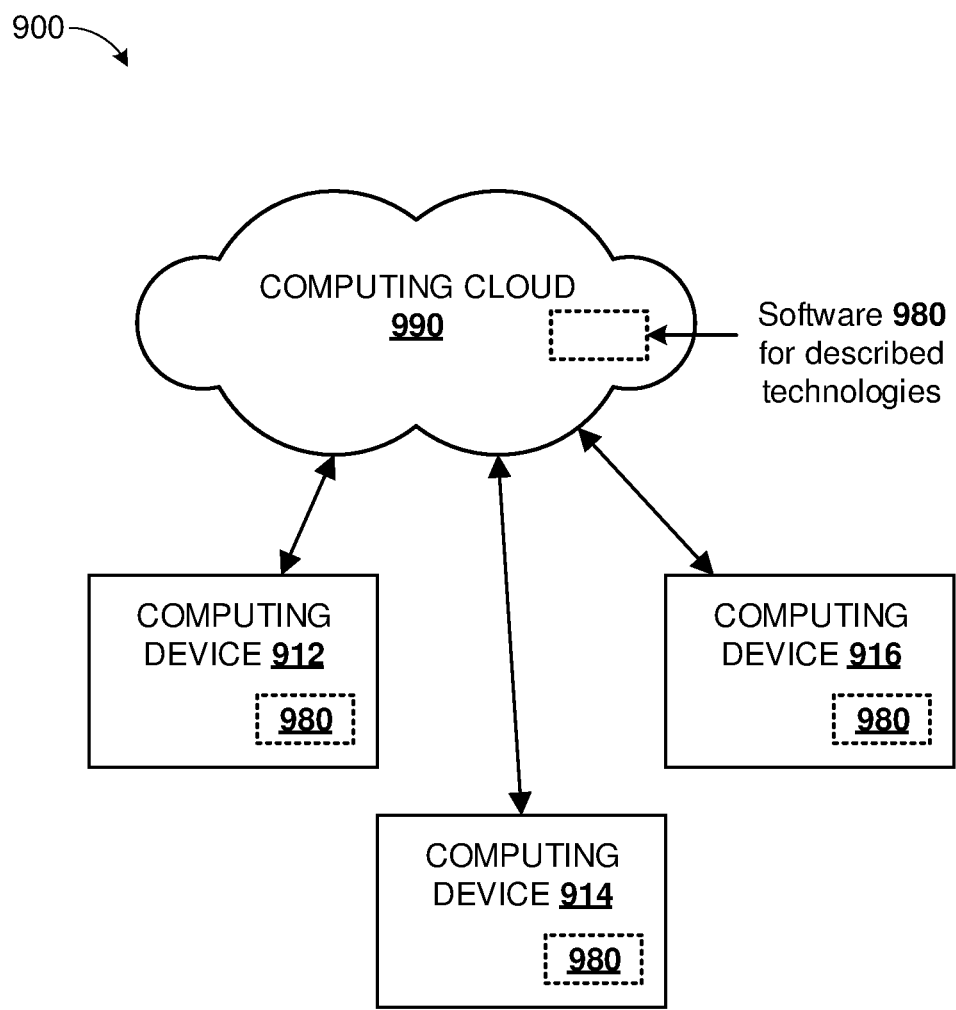
FIG. 9 is a diagram schematically depicting computing devices operating in conjunction with a computing cloud for implementation of disclosed technologies.

FIG. 9 depicts an example cloud computing environment 900 in which the described technologies can be implemented. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., servers, virtual machines, embedded systems, desktop, or laptop computers), mobile devices (e.g., tablet computers, smartphones, or wearable appliances), or other types of computing devices. Communication links between computing cloud 990 and computing devices 912, 914, and 916 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "activate," "call," "change," "configure," "copy," "determine," "disable," "enable," "evaluate," "execute," "failover," "generate," "handle," "indicate," "initialize," "initiate," "install," "invoke," "issue," "launch," "log," "maintain," "manage," "match," "modify," "notify," "output," "perform," "process," "provide," "query," "read," "receive," "recognize," "replicate," "request," "respond," "restart," "return," "retrieve," "save," "serve," "service," "set," "store," "transfer," "transmit," "trigger," "update," "use," or "write" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 824, and storage 840. The terms computer-readable media and computer-readable storage media do not include signals and carrier waves. In addition, the terms computer-readable media and computer-readable storage media do not include communication ports (e.g., 870) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C #, Curl, Dart, Fortran, Go, Java, JavaScript, Julia, Lisp, Matlab, Octave, Perl, Python, R, Ruby, SAS, SPSS, WebAssembly, any derivatives thereof, any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
    storing a script in a database environment comprising one or more database applications; and
    activating the script in the database environment by restarting a pre-existing auxiliary component of the database environment, wherein the auxiliary component is a nameserver;
    wherein the one or more database applications remain operational through the activating.

2. The computer-implemented method of claim 1, wherein the activating comprises:
    responsive to the restarting, executing a hook from the auxiliary component to initialize the script and render the script active.

3. The computer-implemented method of claim 2, wherein the script is initialized by executing one or more initialization functions within the script.

4. The computer-implemented method of claim 1, wherein the script enables maintenance, on distinct first and second server computers, of a replication status of the database environment.

5. The computer-implemented method of claim 4, wherein the replication status is stored to a log, alongside a timestamp of a most recent database transaction.

6. The computer-implemented method of claim 4, wherein the database environment is resident on the first server computer, and the method further comprises:
    at the second server computer, responsive to a failure of the first server computer:
        receiving an external request for the replication status of the database environment; and
        providing the replication status of the database environment in response to the external request.

7. The computer-implemented method of claim 4, further comprising:
    responsive to failure of the first server, and with the replication state indicating that replication of the database environment is active, transferring primary control of the database environment to a replica server computer distinct from the first server computer.

8. The computer-implemented method of claim 1, further comprising:
    handling, by the activated script, one or more requests from an external orchestrator through a host agent of the database environment.

9. The computer-implemented method of claim 1, wherein the database environment comprises an in-memory database.

10. The computer-implemented method of claim 1, wherein the restarting is performed in less than one minute.

11. One or more computer-readable media storing instructions which, when executed by one or more hardware processors, cause the one or more hardware processors to perform operations comprising:

transmitting a script to a database instance comprising one or more database applications wherein the database instance is resident on a first server;

triggering a restart of a pre-existing auxiliary component in the database instance to activate the script on the first server, wherein the one or more database applications remain operational through the restart and the activating the script; and installing a second script at a second server;

wherein the first script is configured to save a state indicator of the database instance and the second script is configured to retrieve the state indicator of the database instance.

12. The one or more computer-readable media of claim 11, wherein the state indicator conveys whether replication of the database instance is enabled or disabled.

13. The one or more computer-readable media of claim 11, further storing the first and second scripts.

14. A system comprising:

a plurality of computing systems each having one or more hardware processors with memory coupled thereto, the computing systems comprising a primary database server computer, a replica server computer, and a host server computer; and a database instance distributed over at least the primary database server computer and the replica server computer, with database queries being serviced from the primary database server computer;

wherein the system has a first state in which a replication status of the primary database server computer is not guaranteed to be known upon failure of the primary database server computer, and a second state in which the replication status of the primary database server computer is guaranteed to be known upon failure of the primary database server computer;

wherein the system is configured to transition from the first state to the second state upon:

restart of a pre-existing auxiliary component of the primary database server computer, resulting in activation of a first disaster recovery support program on the primary database server computer; and activation of a second disaster recovery support program on the host server computer;

wherein the database instance remains operational throughout the transition from the first state to the second state.

15. The system of claim 14, wherein:

the first disaster recovery support program comprises a first script configured to log a replication status of the primary database server computer;

the second disaster recovery support program comprises a second script configured to retrieve the replication status of the primary database server computer; and the system further comprises a daemon on the primary database server computer configured to monitor whether a failure has occurred on the primary database server computer;

wherein the replication status of the primary database server computer is logged at distinct first and second storage locations, the first storage location being at the primary database server computer, and the second storage location being accessible to the second script in a condition that the first storage location is inaccessible.

16. The system of claim 15, wherein the daemon is further configured to copy the replication status from the first storage location to the second storage location.

17. The system of claim 14, wherein the system is configured to respond to failure of the primary database server computer by executing a failover to the replica server computer, conditionally upon the replication status indicating that replication was enabled when the failure occurred.

18. The system of claim 17, wherein the failover is executed automatically.

* * * * *